United States Patent

[11] 3,536,064

[72] Inventors Hiroyuki Kuroda;
Shuhei Ochi and Kenzo Shirakawa,
Kadomashi, Japan
[21] Appl. No. 699,554
[22] Filed Jan. 22, 1968
[45] Patented Oct. 27, 1970
[73] Assignee Matsushita Electric Works, Ltd.
Osaka, Japan
a corporation of Japan
[32] Priority Jan. 31, 1967, Jan. 31, 1967, Feb. 7, 1967,
Feb. 20, 1967, Feb. 28, 1967
[33] Japan
[31] Nos. 42/8,520, 42/8,522, 42/10,343,
42/14,097 and 42/16,599

[54] ELECTRIC MASSAGER
4 Claims, 8 Drawing Figs.
[52] U.S. Cl. .................................................. 128/49
[51] Int. Cl. .................................................. A61h 7/00

[50] Field of Search.......................................... 128/32, 48, 49, 59, 44, 24.2, 61

[56] References Cited
UNITED STATES PATENTS

| | | | |
|---|---|---|---|
| 718,766 | 1/1903 | Ingram | 128/61 |
| 803,708 | 11/1905 | Patchen | 128/48 |
| 1,377,140 | 5/1921 | North | 128/59 |
| 1,889,345 | 11/1932 | Blondin | 128/59X |
| 2,639,707 | 5/1953 | Brown | 128/49 |

Primary Examiner—L. W. Trapp
Attorney—Pierce, Scheffler and Parker

ABSTRACT: An improved electric massager, which comprises a case, an electric motor contained in said case and a means for giving an oscillating motion from the torque of said motor to at least one operating lever pivoted to a gear box fixed within said case.

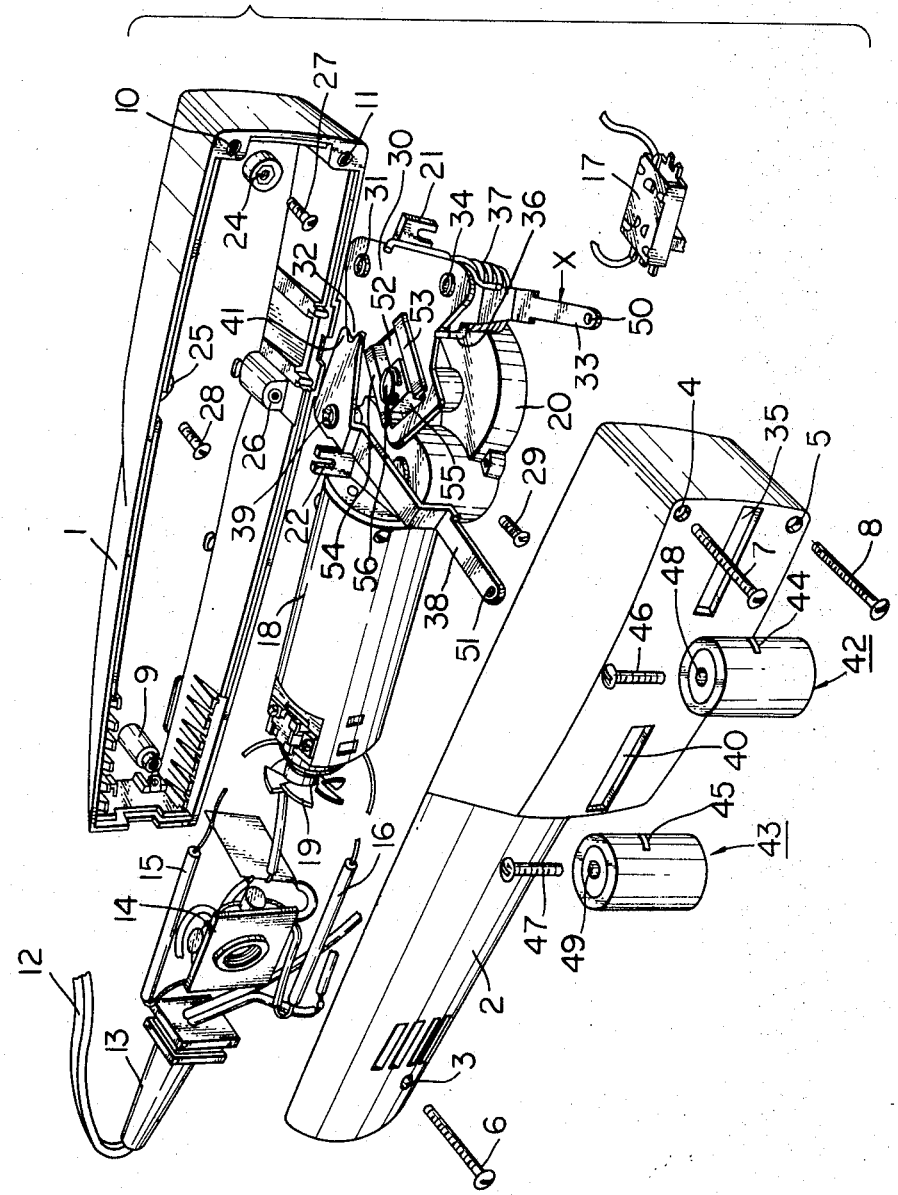

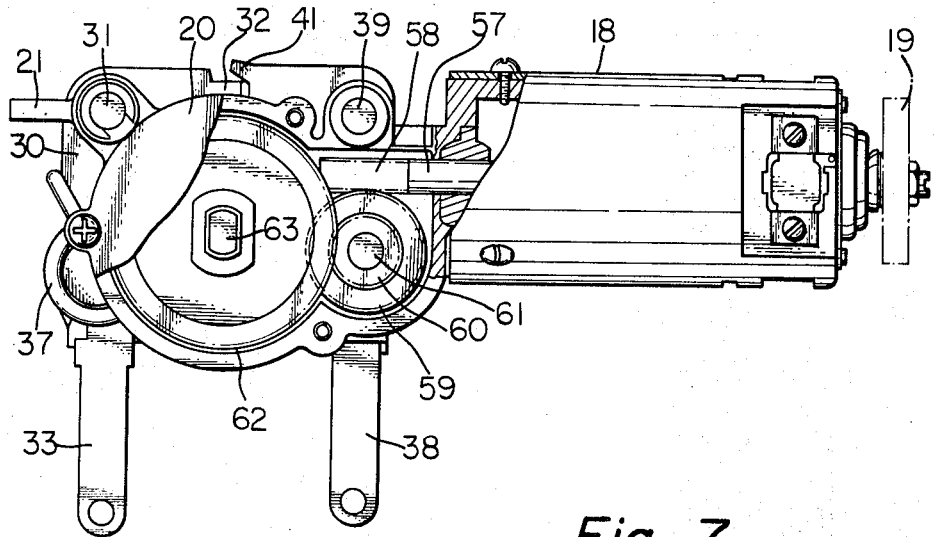
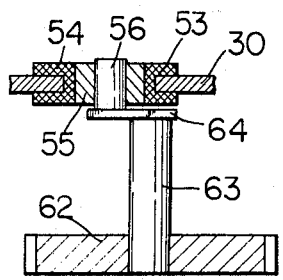
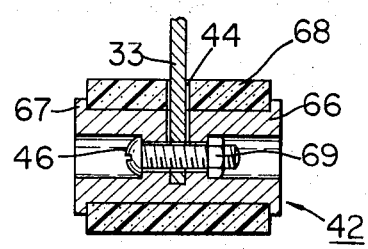
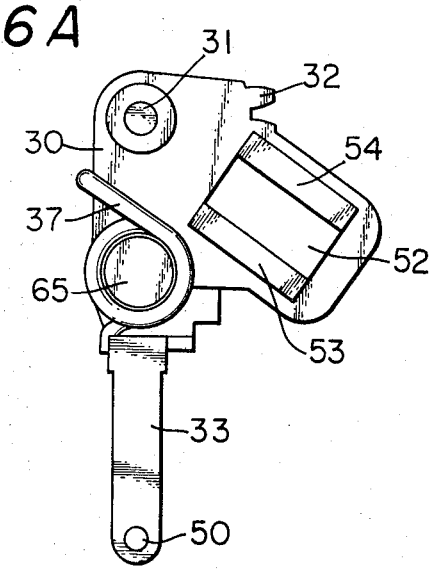
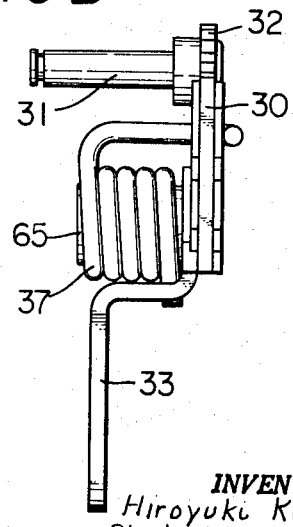

ELECTRIC MASSAGER

This invention relates to electric massagers.

There are already generally known electric massagers of a type in which a vibrating piece is attracted and vibrated by an electromagnet and of a rotary type in which an eccentric weight is rotated by a rotary shaft of an electric motor. These known conventional electric massagers have drawbacks that, as attachments are vibrated at a frequency of 7200 to 8000 cycles/minute and a massage is carried out by the vibration of such attachments, it is unpleasant to massage the head or a position near the head and that, since only the surface of the skin is massaged, the effect of the massage does not reach the deeper layers of skin and muscle layer under the skin.

The present invention is suggested to eliminate the above mentioned drawbacks.

A main object of the present invention is to provide a massager wherein two operating levers projecting from the side of the instrument body are made to respectively perform oscillating motions in directions opposed to each other and an attachment is rotatably pivoted to one of the operating levers through a spring so that a painless effective massage may be carried out on muscles.

Another object of the present invention is to provide a massager which is long in the lateral direction and easy to hold.

A further object of the present invention is to provide a massager in which the attachment is easy to mount and dismount and to clean and the cushion is easy to replace.

A still further object of the present invention is to provide a massager subject to little wear and noise.

Other objects and advantages of the present invention will be made clear by the perusal of the following detailed explanation with reference to the drawings.

FIG. 3 is a disassembled perspective view.

FIG. 4 is a partly sectioned side view from the other side showing a gear mechanism and a connecting mechanism for a gear box and an electric motor.

FIG. 5 is a sectioned side view showing the relation between an eccentric cam and a slider.

FIG. 6 shows a coiled spring as fitted, (A) being a back view and (B) being a side view.

FIG. 7 is a sectioned view of an attachment.

Figure 1:
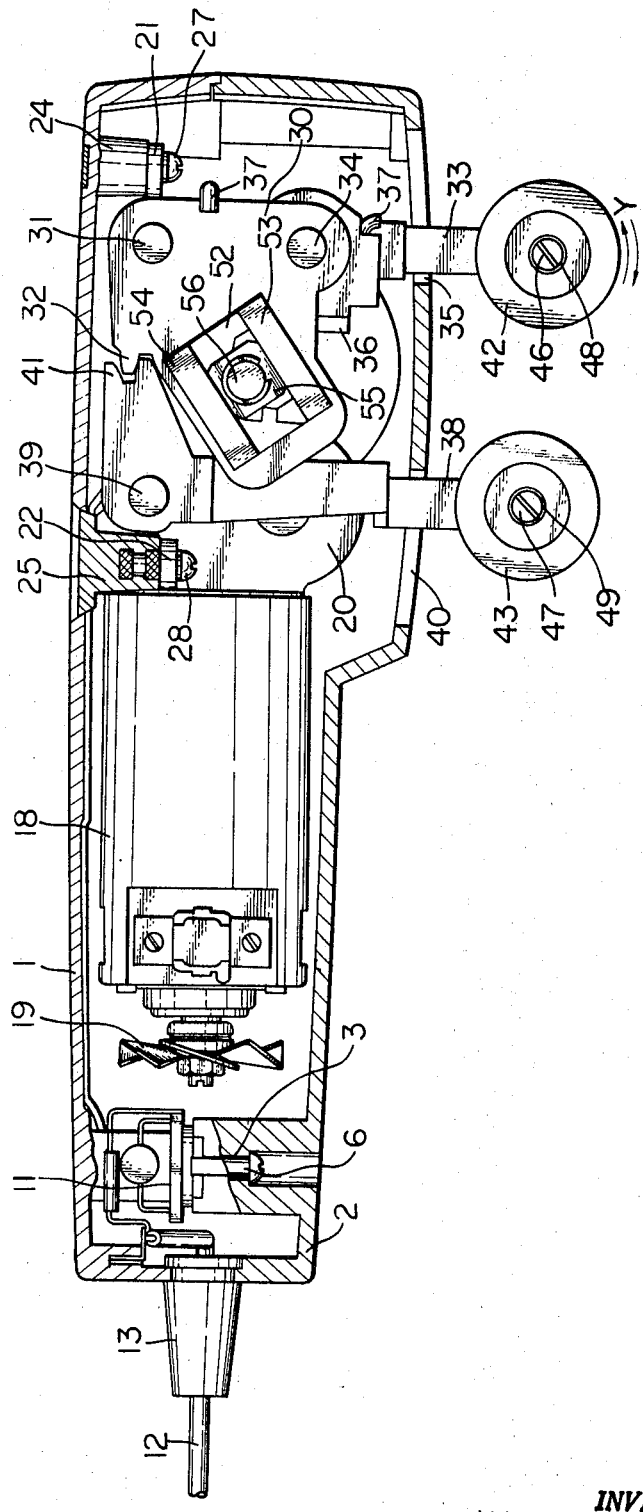
FIG. 1 is a partly sectioned side view of a massager of the present invention with the covers centrally sectioned.
Figure 2:
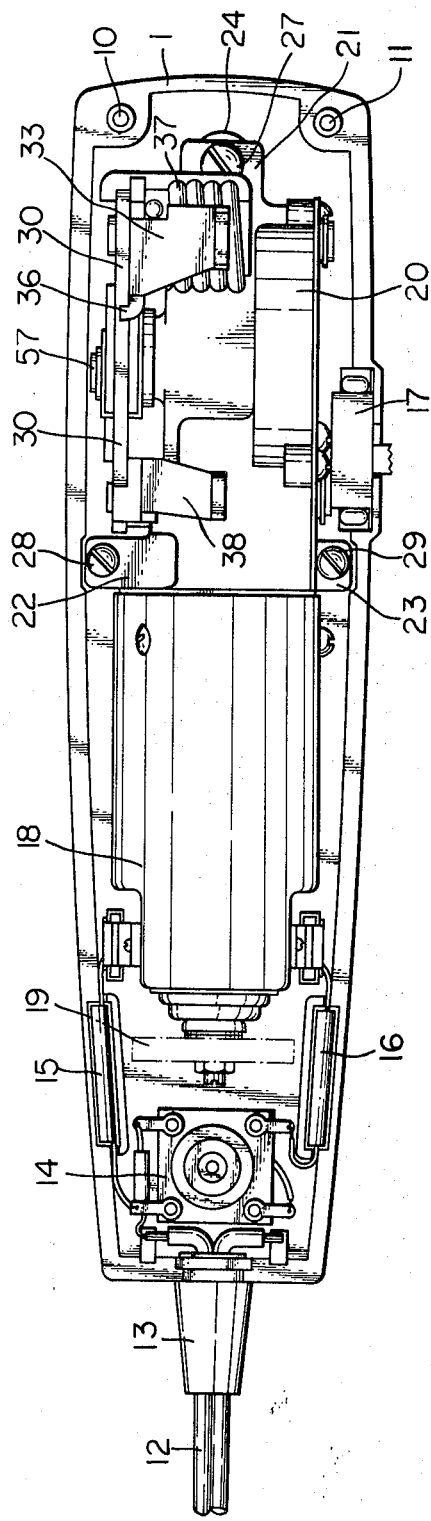
FIG. 2 is a bottom view of the same with the lower cover and the attachments removed.

The present invention shall be explained with reference to a preferred embodiment. But it should be understood that the invention is not to be limited to the specific embodiment shown here but is to include arrangements equivalent to various modifications to be included in the claims and its spirit.

In the drawings, 1 and 2 are cases and bolts 6, 7 and 8 are inserted respectively into holes 3, 4 and 5 made in the case 2 and are screwed respectively into threaded fixing holes 9, 10 and 11 formed in the case 1 so that the cases 1 and 2 may be integrally combined with each other. Twelve is a cord, 13 is a bushing, 14 is a rectifier part, 15 and 16 are noise preventing coils, 17 is a switch, 18 is a motor part, 19 is a fan and 20 is a gear box. Said gear box 20 and motor part 18 are integrally combined with each other. Twenty-one, 22 and 23 are fixing holes for said gear box 20. Twenty-four, 25 and 26 are fixing threaded holes made in the case 1. Bolts 27, 28 and 29 are screwed respectively into the fixing holes 21, 22 and 23 and the fixing threaded holes 24, 25 and 26 so that the gear box 20 may be secured within the case 1.

Thirty is a first operating lever pivoted to the gear box 20 with a shaft 31 and having a gear part 32 formed at one end. Thirty-three is a second operating lever pivoted to the first operating lever 30 with a shaft 34, projected out of the instrument at one end through an opening 35 in the case 2 and engaged in the bent part at the tip of an arm 36 provided in the middle with the lower side of the first operating lever 30. Thirty-seven is a coiled spring engaged at one end with the right side of the first operating lever 30 and at the other end with the right side of the second operating lever 33 so as to give a resiliency in the direction indicated by the arrow X (FIG. 3). Thirty-eight is a third operating lever pivoted to the gear box 20 with a shaft 39, projected out of the instrument at one end through an opening 40 in the case 2 and having a gear part which is meshed and related with the gear part 32 of the first operating lever 30 formed at the other end.

Forty-two and 43 are attachments. The second operating lever 33 and third operating lever 38 are inserted at the tips respectively into openings 44 and 45 made in the peripheral barrel parts of the attachments 42 and 43 and bolts 46 and 47 are inserted respectively into fixing holes 48 and 49 in the attachments 42 and 43 and into holes 50 and 51 at the tips of said operating levers 33 and 38 so that the attachments may be fixed to the respective operating levers.

Fifty-two is an opening made in the first operating lever 30. Fifty-three and 54 are guides made of plastic and engaged with the respective sides of said opening 52. A slider 55 is set between these guides 53 and 54. Fifty-six is an eccentric shaft inserted in said slider 55.

The mechanism within the gear box shall now be explained.

In FIGS. 4 and 5, 57 is a rotary shaft of an electric motor (not illustrated) contained in the gear box 20, 58 is a worm formed at the tip of said rotary shaft 57 and 59 is a worm wheel meshing with said worm 58 and having a gear 60 fixed with a common shaft 61. Sixty-two is a gear meshing with said gear 60 and fixed to a rotary shaft 63. Sixty-four is an eccentric cam formed at the tip of said rotary shaft 63. Fifty-six is the eccentric shaft of said eccentric cam 64. The slider 55 is fitted to said eccentric shaft 56.

FIGS. 6A and 6B shows the coiled spring as fitted. The coiled spring 37 is fitted to a pillar 65 and is engaged at the respective ends with the first operating lever 30 and second operating lever 33 so as to be fixed.

FIG. 7 shows the details of the attachment. Only the connection between the second operating lever 33 and its attachment shall be described. Sixty-six is a cylindrical attachment body provided with a flange 67 at each end of the outer periphery. A cushion 68 made of such elastic body as a foamed polyethylene, foamed vinyl chloride or sponge rubber is wound on said cylindrical attachment body 66 so as to be in contact along the peripheral edge with said flange 67. The second operating lever 33 is inserted into the opening 44 made in the cushion 68 and attachment body 66 at the time of fitting the cushion and the second operating lever 33 and the attachment are secured with a bolt 46 and a nut 69.

The operation of the present invention shall now be explained.

When the switch 17 is switched on, a direct current rectified by the rectifier part 15 will be applied to the electric motor part 18, the worm 58 will rotate with the rotation of the motor and this rotary motion will be transmitted to the worm wheel 59 and the gears 60 and 62 so as to rotate the rotary shaft 63. With the rotation of the rotary shaft 63, the eccentric cam 64 will rotate and the eccentric shaft 56 will make a circular motion. Therefore, the slider 55 fixed to said eccentric shaft 56 will reciprocate through the guides 53 and 54 within the opening 52 made in the first operating lever 30. Therewith, the first operating lever 30 and also the attachment 42 connected to it through the second operating lever 33 will be oscillated in the direction indicated by the arrow Y. Further, through the gear part 41 meshing with the gear part 32 of the first operating lever 30, the third operating lever 38 will be oscillated in the direction opposed to that of the second operating lever 33 and its attachment 43 will be oscillated in the direction opposed to that of the attachment 42.

A feature of the present invention is that the third operating lever provided with the attachment is rotatably pivoted through the coiled spring to one of a pair of the operating levers oscillated in the directions opposed to each other by such mechanism as is mentioned above so that, in case an overload is applied during the oscillation of both attachments, one attachment may be flexed, therefore the overload may be shared by the spring part and, at the same time, in the case of actually massaging muscles, the oscillating distance between the attachments may vary in response to the load and therefore a painless effective message may be made.

Another feature of the present invention is that the electric motor, cooling fan and rectifier are linearly arranged within the body case, a pair of the operating levers are pivoted to the gear box combined integrally with the motor part and these operating levers are projected out on the side of the body case so that the electric massager may be formed in a form long in the lateral direction and easy to hold.

A further feature of the present invention is that each operating lever is inserted through the opening in the cylindrical attachment base enclosed with the cushion and is connected with the attachment by means of the bolt and nut so that the mounting operation of the attachment may be made so simple that general users can easily mount, dismount and wash the attachment part and replace the cushion.

Another feature of the present invention is that, in order to drive the operating lever, the square slider is fitted and fixed to the eccentric shaft and is reciprocated along the guides made of plastics and fixed to both side edge parts of the opening in the operating lever, so that wear and noise may be reduced even in a nonlubricated state.

A further feature of the present invention is that the gear box is integrally combined with the motor part and is set and fixed inside one half of the body case split into two halves so that the electric massager may be assembled very simply.

We claim:
1. An electric massage device comprising a casing, an electric motor mounted therein, a speed change gear driven by said motor, an eccentric pin rotatable by said gear, a slider member mounted on said eccentric pin for reciprocal movement when said eccentric pin is rotated, a lever pivotally mounted at one end to said casing, a second lever pivotally mounted at one end to said casing, said second lever including hinge means intermediate its ends massage elements at the opposed ends of said levers extending outside of said casing, means whereby said levers are movable in an oscillatory manner by said slider member and spring means resiliently urging said second lever into a normal position about its hinge means, whereby excess load on said massage elements is absorbed by said spring means and not transmitted to said motor.

2. A device as claimed in claim 1 wherein said motor includes a driven shaft and the speed change gear is mounted on the side of said driven shaft.

3. A device as claimed in claim 1 and further comprising means for removably mounting said massage elements on said levers and wherein said massage elements comprise an elastic material.

4. A device as claimed in claim 1 wherein the casing is divided into two halves along a longitudinal axis and wherein the motor and speed change gear are each mounted onto the same half of the casing.